United States Patent [19]

Schumann et al.

[11] Patent Number: 4,574,840
[45] Date of Patent: Mar. 11, 1986

[54] MULTIPORT AXIAL VALVE WITH BALANCED ROTOR

[75] Inventors: Gary M. Schumann; Charles A. Dolejs, both of Arlington Heights; David L. Schick, Mt. Prospect, all of Ill.

[73] Assignee: UOP Inc., Des Plaines, Ill.

[21] Appl. No.: 687,350

[22] Filed: Dec. 28, 1984

[51] Int. Cl.[4] ............................................. F16K 11/06
[52] U.S. Cl. .......................... 137/625.15; 137/625.46; 251/174
[58] Field of Search ...................... 137/625.46, 625.11, 137/625.15, 625.12, 625.13; 251/174

[56] References Cited

U.S. PATENT DOCUMENTS

| | | |
|---|---|---|
| 2,985,589 | 5/1961 | Broughton et al. ................... 210/34 |
| 3,040,777 | 6/1962 | Carson et al. ..................... 137/625.15 |
| 3,192,954 | 7/1965 | Gerhold et al. ................. 137/625.11 |
| 3,422,848 | 1/1969 | Liebman et al. ................ 137/625.15 |
| 4,286,624 | 11/1981 | Clausen et al. ................. 137/625.46 |

Primary Examiner—Alan Cohan
Assistant Examiner—John A. Rivell
Attorney, Agent, or Firm—Thomas K. McBride; William H. Page, II; Richard J. Cordovano

[57] ABSTRACT

A unitary axial multiport rotary valve capable of accomplishing the simultaneous interconnection of a plurality of conduits in accordance with a previously determined cycle, where any conduit communicates with no more than one other conduit at any one cycle step, or valve index position. The conduits to be interconnected are attached to a hollow stationary body, or stator assembly, which is comprised of three sections, or elements, each of which is cylindrical in exterior form. There are fluid flow paths in a rotating body, or rotor assembly, which is located inside the stator assembly. The rotor assembly assumes various positions according to the cycle steps and distributes fluid flowing into and out of the valve in a different manner in each cycle step. There are spaces between the rotor and stator assemblies which contain sealing means for prevention of leakage and definition of flow passages. In one embodiment, the rotor assembly is configured such that axial forces exerted by the fluid streams are exerted equally in both directions, thereby providing a balanced rotor assembly floating between its axial restraints.

9 Claims, 9 Drawing Figures

MULTIPORT AXIAL VALVE WITH BALANCED ROTOR

FIELD OF THE INVENTION

This invention relates to apparatus for transferring a plurality of fluid streams among different locations. More particularly, it relates to a unitary multiport rotary axial valve which is capable of accomplishing the simultaneous interconnection of a plurality of conduits in accordance with a predetermined periodic sequence.

INFORMATION DISCLOSURE

U.S. Pat. Nos. 3,040,777 (Carson et al.) and 3,422,848 (Liebman et al.) describe multiport rotary disc valves which have been used in practicing the process of U.S. Pat. No. 2,985,589 (Broughton et al.), which is described herein, and other similar processes. A valve having utility similar to the apparatus of Carson and Liebman is disclosed in U.S. Pat. No. 3,192,954 (Gerhold et al.); this valve employs a cylindrical rotor within a surrounding stator, as exemplified by FIG. 8.

BRIEF SUMMARY OF THE INVENTION

This invention is an axial multiport valve useful in transferring a plurality of different fluid streams among different locations in accordance with a previously determined cycle. The fluid streams are contained in conduits which are interconnected by means of the valve. Any conduit communicates with no more than one other conduit at any one cycle step, or valve index position. The conduits to be interconnected are attached to a hollow stationary body, or stator assembly, which is comprised of three sections, or elements, each of which is cylindrical in form.

There are fluid flow channels in a rotating body, or rotor assembly, which is located inside the stator assembly. The rotor assembly assumes various positions according to the cycle steps and distributes fluid flowing into and out of the valve in a different manner in each cycle step. There are spaces between the rotor and stator assemblies which contain sealing means for prevention of leakage and definition of flow passages.

There are many instances in which it is necessary to route a fluid stream to one location for a period of time, then to another location for a period of time, and so forth for multiple locations. This relatively simple problem of routing a single fluid stream to various destinations in a previously determined cycle or periodic sequence is easily accomplished with one or more devices such as a multiport rotary plug valve. When it is necessary to simultaneously route more than a single fluid stream to various destinations, it is highly desirable to use a single device rather than numerous individual valves, as discussed in the above-mentioned Carson U.S. Pat. No. (3,040,777). A multiport rotary axial valve is such a device.

It is among the objects of this invention to provide unitary mechanical valve apparatus for simultaneously accomplishing the interconnection of a plurality of conduits in accordance with a previously determined cycle.

It is also among the objectives to provide a valve smaller in physical size and having fewer maintenance requirements than prior art valves.

A broad embodiment of the invention is a valve comprising:

(a) a stator assembly having a hollow interior and being comprised of a central element, a first end element, and a second end element, each of said elements having a cylindrical exterior form, the central element having first and second interior transverse surfaces, each transverse surface being perpendicular to an axis of rotation, which axis of rotation is the longitudinal axis of both the stator assembly and a rotor assembly, the central element having a plurality of internal ports, each port extending from one of the transverse surfaces toward the other transverse surface and being parallel to the axis of rotation, where the intersections of the ports which each transverse surface are arranged in a circle centered on the axis of rotation, and the central element having a plurality of openings, where each opening extends from a port to the exterior surface of the stator central element;

(b) said rotor assembly comprised of a spacer element, a first end element, and a second end element, where the spacer element is rigidly connected between the end elements, which rotor assembly is located substantially inside the hollow interior of the stator assembly such that a first annular volume is formed between said first rotor end element and said first stator end element, a second annular volume is formed between said second rotor end element and said second stator end element, a first transverse volume is formed between said first transverse surface of said central stator element and an end surface of the first rotor end element, and a second transverse volume is formed between said second transverse surface of said central stator element and an end surface of the second rotor end element, each of said rotor element end surfaces being parallel to said central stator element transverse surfaces, which rotor assembly rotates about said axis of rotation to various valve index positions in accordance with said previously determined cycle, and which rotor assembly has a plurality of interior channels;

(c) a plurality of nozzles for connection of said conduits to the valve, the nozzles being located on the stator assembly and providing fluid paths between conduits and said annular volumes inside the stator assembly and between conduits and said central stator element openings;

(d) means in said annular volumes for definition of fluid passages which communicate with said interior channels of the rotor assembly, such that fluid passes between said rotor end element nozzles and said rotor channels via said annular volume fluid passage means;

(e) port sealing means for preventing flow through only one end of each of said central stator element ports; and (f) means in said transverse volumes for definition of fluid passages which communicate between said interior channels of the rotor assembly and the ends of said ports which are not equipped with said port sealing means, such that fluid passes between said central stator element nozzles and said rotor channels via said central stator element openings, at least a portion of said ports, and said transverse volume fluid passages, thereby completing fluid paths so that different pairs of nozzles communicate at each valve index position, in accordance with said previously determined cycle.

Among the unique features of the present invention is an arrangement for eliminating or minimizing unbalanced axial forces resulting from the pressures exerted by the fluids flowing through the valve. The rotor assembly is configured such that axial forces exerted by the fluid streams are exerted equally in both directions, thereby providing a balanced rotor assembly floating between its axial restraints. In this embodiment, each port of the stator central element intersects both of said interior transverse surfaces of the stator central element, said port sealing means transfers at least a portion of the force resulting from fluid pressure exerted on it to the adjacent rotor end element, and effective axial pressure area associated with each port end region is the same for the two ends of any particular port, whereby force exerted on the left rotor end element by fluid in any port is substantially equal to force exerted on the right rotor end element by fluid in that same port.

BACKGROUND OF THE INVENTION

Figure 1:
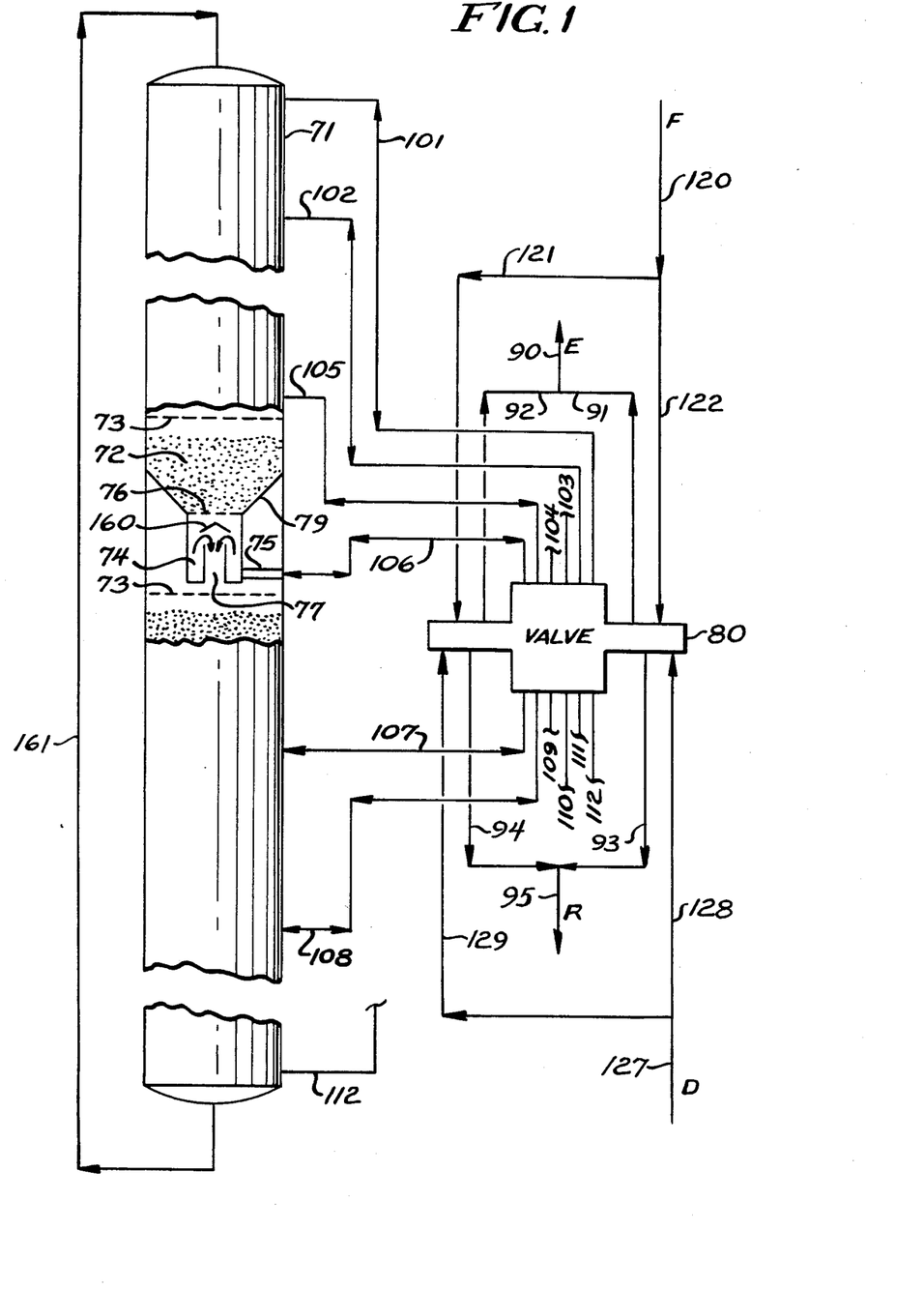
FIG. 1 is a schematic depicting the Broughton process (U.S. Pat. No. 2,985,589); it shows a vessel containing a plurality of beds and conduits connecting the beds with an axial rotary valve and also shows conduits for streams entering and leaving the process connected to the valve.

The separation of various substances through selective absorption using a simulated moving bed of adsorbent is an example of a process in which an axial multiport rotary valve is useful. Simulation of a moving adsorbent bed is described in U.S. Pat. No. 2,985,589 (Broughton et al.), which is mentioned above. FIG. 1 depicts process and apparatus of this patent. In accomplishing this simulation, it is necessary to connect a feed stream to a series of beds in sequence, first to bed no. 1, then to bed no. 2, and so forth for numerous beds, the number of beds often being between 12 and 24. These beds may be considered to be portions of a single large bed whose movement is simulated. Each time the feed stream destination is changed, it is also necessary to change the destinations or origins of at least three other streams, which may be streams entering the beds, such as the feed stream, or streams leaving the beds. The moving bed simulation may be simply described as dividing the bed into a series of fixed beds and moving the points of introducing and withdrawing liquid streams past the series of fixed beds instead of moving the beds past the introduction and withdrawal points.

The multiport rotary disc valve of Carson No. (3,040,777) provided a satisfactory valve design for the simultaneous interconnection of two independent groups of conduits such that each conduit of the first group could be brought into individual communication with every conduit of the second group. Upon reference to FIG. 1 and Broughton No. (2,985,589), it can be seen that there are two groups of conduits which need to be interconnected. One group consists of the conduits which provide the flows entering and leaving the simulated moving bed adsorbent system, that is, the flows which are switched among the beds, such as the feed stream. A second group consists of the conduits associated with the individual beds, that is, which supply and remove fluid from the beds, one conduit being connected between each two beds. It is to be noted that each conduit of the second group serves that dual function of supply and removal, so that it is unnecessary to provide conduits for supplying fluid separate from those for removing fluid.

There are many different process requirements in moving bed simulation processes, resulting in different flow schemes and thus variations in rotary valve arrangement. For example, in addition to the four basic streams described in Broughton No. (2,985,589), it may be desirable to utilize one or more streams to purge, or flush, a pipeline or pipelines. A flush stream is used to prevent undesirable mixing of components. The flush substance is chosen to be one which is not undesirable for mixing with either main stream, that being purged or that which enters the pipeline after flushing is completed. U.S. Pat. No. 3,201,491 (Stine et al.) may be consulted for information on flushing lines as applied to the process of Broughton No. (2,985,589). It may be desirable to pass fluid through a bed or beds in the reverse direction from normal flow. This is commonly known as backflushing, a subject treated in U.S. Pat. No. 4,319,929 (Fickel).

Multiport rotary disc valves of the general arrangement shown in the above-mentioned U.S. Pat. Nos. (3,040,777 and 3,422,848) have been fabricated in various sizes up to valves utilizing 4½ foot diameter rotors. These valves have seven concentric circumferential grooves, or tracks, and 24 ports spaced around the periphery of the stator. A single valve of this size weighs approximately 26,000 pounds, has an overall height of about 15 feet, and occupies a plan area of approximately 8½ by 8½ feet. These figures do not include a separate hydraulic power unit used with the hydraulically driven actuator mounted on the valve proper. It can be appreciated that it is desirable to use apparatus of less bulk and weight to accomplish the same functions; the present invention provides such a smaller rotary valve.

It is highly desirable to use a single device to simultaneously transfer all of the fluid streams, thereby avoiding the obvious problems associated with numerous separate valves which must be simultaneously actuated.

BRIEF DESCRIPTION OF THE DRAWINGS

FIG. 6 is taken.

DETAILED DESCRIPTION OF THE INVENTION

Following is a description of the embodiment of the invention shown in FIGS. 1 through 8. It is not intended that such description be construed as limiting the scope of the invention in any way; the description of this example is merely a convenient means to become familiar with the invention. The elements of the invention may be arranged to form other embodiments and more or fewer conduits than shown in these drawings may be accommodated. Various required equipment, such as pumps and control valves, has been omitted as not essential to an understanding of the invention, the application of such being within the capabilities of those skilled in the art.

FIG. 1 depicts an exemplary processing system which will be used in describing the invention. This process is described fully in previously mentioned U.S. Pat. No. 2,985,589 (Broughton) and it is only necessary to describe herein, in order to understand the present invention, the required fluid flow arrangement and cycle, further details being available from the patent. An explanation of the process is presented above and supplemented in the following paragraphs.

Referring to FIG. 1, there are twelve beds in vessel 71; one bed 72 is shown in the cutaway portion of FIG. 1. The bed 72 is retained by bed support means 76, such as a screen, at the bottom of the conical section 79. Liquid is distributed evenly over the top of the bed by distributor 73, which may be a perforated plate. Liquid which flows through the bed is collected in reservoir 74. If liquid is to be removed from reservoir 74, it will flow out through an internal conduit 75 which communicates between the reservoir and a conduit 106 external to vessel 71. Conduit 106 carries liquid to rotary valve 80. If liquid is not to be removed, the flow path is blocked inside valve 80 and liquid overflows the reservoir and pases through downcomer 77 to another distributor 73, to be distributed over the next lower bed. If liquid is to be added, it flows in from the valve through conduit 106, overflows into the downcomer, and is distributed over the next lower bed in the same manner as liquid flowing through bed 72. Baffle 160 prevents liquid leaving bed 72 from passing directly through downcomer 77 without being collected in reservoir 74. A conduit such as conduit 106 is associated with each bed and functions in the same manner as conduit 106. The twelve conduits, each of which runs between the vessel and the valve, are denoted 101 through 112.

There are four basic process streams. There may be additional streams, such as the flush stream mentioned above. This example is limited to the four basic process flows, whose connection points to vessel 71 and the beds therein are changed at each cycle step. They are labeled in FIG. 1; F denotes feed (conduits 120, 121, 122), D denotes desorbent (conduits 127, 128, 129), E denotes extract (conduits 90, 91, 92), and R denotes raffinate (conduits 93, 94, 95). Each of the conduits containing a process stream has two branches, one branch conduit connecting to each end of the valve. For example, the branch conduits of extract conduit 95 are conduits 93 and 94.

Since there are twelve beds and four process streams, liquid flows to or from any given bed only intermittently. The simulated moving bed may be viewed as being divided into four zones, one zone corresponding to each process stream. For example, if each zone contains three beds, liquid flows in conduit 106 every third step and during the other two steps, all liquid leaving bed 72 flows through downcomer 77 to the bed below. If the beds are numbered from B1 through B12, starting at the top of vessel 71, bed 72 is B6. If, at cycle step 1, feed (F) flows to bed B6, then raffinate (R) will flow from bed B9, desorbent (D) will flow to bed B12, and extract (E) will flow from bed B3. During step 2, F will flow to B7, R from B10, D to B1 and E from B4. The flows will sequence in a similar manner through the balance of the twelve steps of the cycle and then repeat. Return line 161 carries liquid which has passed through bed B12 (or entered through conduit 112) to the top of vessel 71 for distribution over bed B1. It is not necessary that each zone contain an equal number of beds. In the detailed example, two zones each contain 2 beds and two zones each contain 4 beds. This can be seen by referring to FIG. 8.

Figure 2:
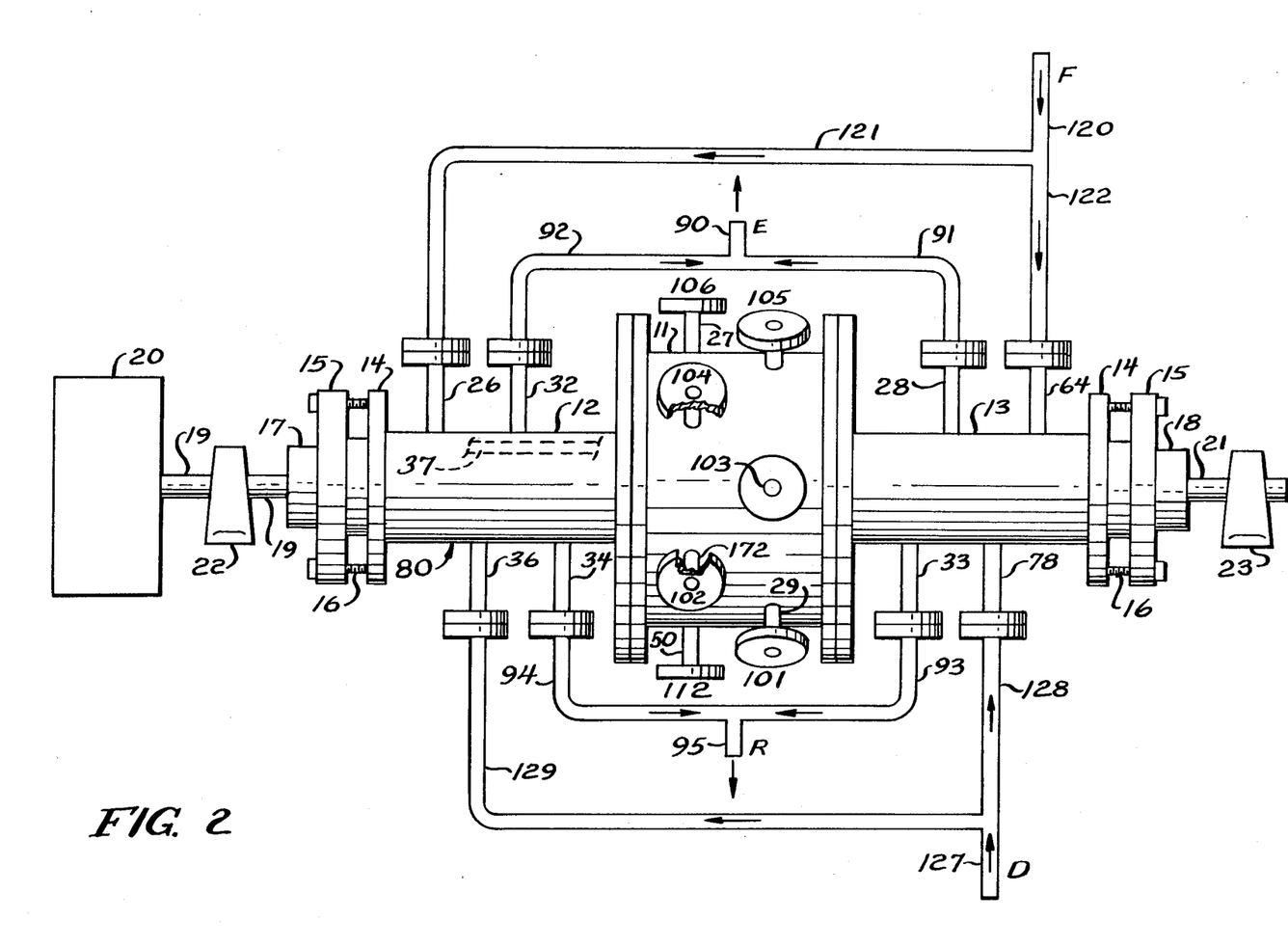
FIG. 2 depicts a multiport axial rotary valve with piping and labels referring to FIG. 1. Certain details are omitted for the sake of drawing convenience.

Referring to FIG. 2, a hollow stator assembly is comprised of central element 11, end element 12, and end element 13. In this embodiment of the invention, the end elements of the stator assembly are bolted to the central element (bolts not shown for drawing convenience). A rotor assembly is located substantially within the hollow interior of the stator assembly. Only a portion of the rotor assembly is shown in FIG. 2. Rotor end element 17 projects out of stator end element 12 and rotor end element 18 projects out of stator end element 13. Attached to the rotor are shafts denoted by 19 and 21, and the rotor is supported in bearing assemblies 22 and 23. Each stator end element has a flange 14, to which seal ring followers 15 are attached by bolts 16. The function of the seal ring followers is discussed below. Either assembly, rotor or stator, may be separable into parts independent of the terminology used herein; the use of the word elements is not intended to convey that the assembly must be separable into the three elements described. Each of the stator elements is cylindrical in exterior form.

Means for rotating the rotor assembly about an axis of rotation are denoted by reference number 20. The axis of rotation is the extended center line of shafts 19 and 21, or the longitudinal axis of both assemblies. In this particular example, the rotor is rotated in 30° increments, with any one of twelve rest positions of the rotor being defined as a valve index position and representing the rotor position at, or during, a single cycle step. Such means for indexing a shaft, or rotating it in increments of usually less than a full rotation, are well known and may be characterized broadly as hydraulic, electrical, or electromechanical. An example of means for rotating may be found in U.S. Pat. No. 2,948,166 (Purse el al).

Referring to FIGS. 1 and 2, the twelve conduits, 101 through 112, are connected to twelve nozzles attached to stator central element 11 of valve 80. Five of the nozzles do not appear in FIG. 2. The nozzles of FIG. 2 are labeled 101 through 106 and 112 to indicate which conduits are connected to them, e.g., conduit 106 is connected to nozzle 27. There are four nozzles attached to each stator end element, 12 and 13. Each of the four process streams is routed to each end element. For example, feed (F) in conduit 120 is supplied to each end element by means of conduits 121 and 122, which branch off from conduit 120.

Figure 3:
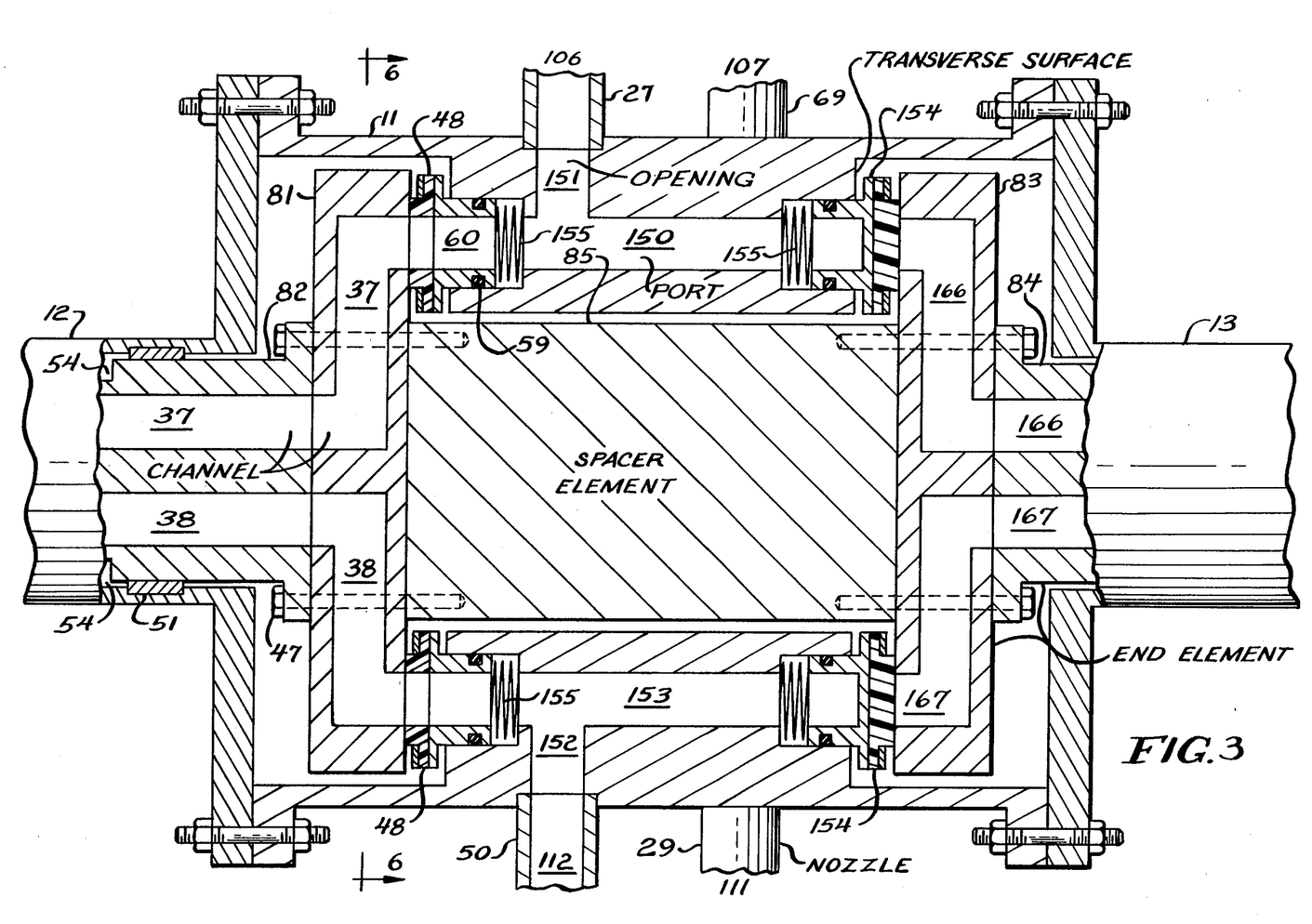
FIG. 3 is a vertical section view of the central portion of valve of FIG. 2, which includes portions of rotor and stator end elements. The rotor position is that of cycle step 1. Certain details are omitted for the sake of drawing convenience. Section arrows show how
Figure 4:
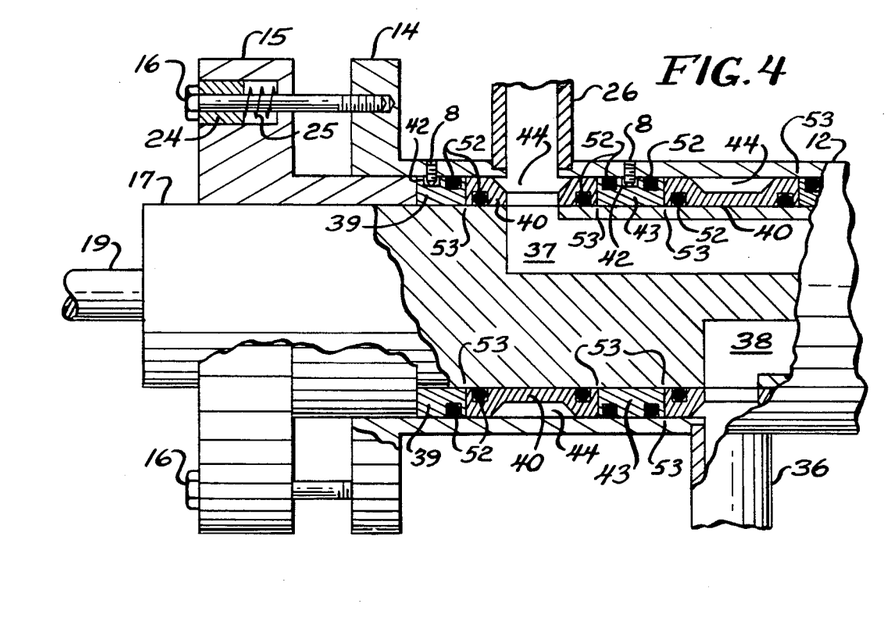
FIG. 4 is a partial section view of the left hand end of the valve of FIG. 2, including a portion of a stator end element, and a portion of a rotor end element. The rotor position is that of cycle step 1. Certain details are omitted for the sake of drawing convenience.

Now referring to FIG. 4, which depicts the left end of the exemplary valve, the applicable reference numbers of FIG. 2 are used. Rotor end element 17 is located substantially inside stator end element 12. Nozzles 26 and 36 of FIG. 2 are shown in FIG. 4. Two interior channels 37 and 38 are shown in rotor end element 17. One channel (37) is depicted in FIG. 2. There are two additional channels (not shown) in rotor element 17 and all four channels, which comprise a first group, extend into the rotor end element portion which is shown in FIG. 3. Channel 37 communicates with nozzle 26 and channel 38 communicates with nozzle 36. Stator end element 12 has a larger inside diameter than the outside diameter of rotor end element 17, thus forming an annular space, or annular volume, between the elements. As shown in FIG. 4, this annular space contains a number of seal rings. In contact with the portion of seal ring follower 15 which projects into the annular volume is an end seal ring 39. Adjacent to end seal ring 39 is a rotating seal ring 40 and next to that is a stationary seal ring 43. Another rotating seal ring 40 is adjacent to stationary seal ring 43 on the other side. In a similar manner, an annular volume is formed between rotor end element 18 and stator end element 13 (FIG. 2).

Figure 5:
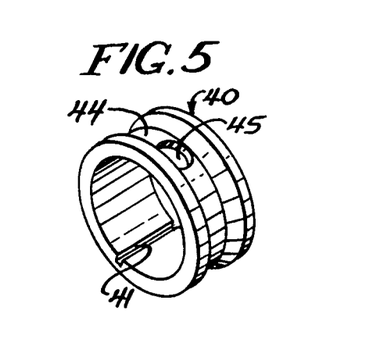
FIG. 5 depicts a rotating seal ring.

All of the nozzles located on the stator end elements communicate with the annular spaces existent between the rotor end elements and the stator end elements. The seal rings are means by which fluid passages in the end element annular spaces are defined, intermixing of fluids in the annular spaces is prevented, and external leakage is prevented. For example, fluid flowing in channel 37 and nozzle 26 is separated from fluid in channel 38 and nozzle 36 by the seal rings. Rotating seal ring 40 extends circumferentially around the rotor end element and is configured such that annular passage 44 is formed in a portion of the annular space between the stator and rotor end elements, between the inside wall of the stator end element and the outside surface of ring 40. FIG. 5 shows an entire rotating seal ring. Note that O-rings 52 are omitted from the inner surface of the seal ring depicted in FIG. 5. An aperture 45 (FIG. 5) in seal ring 40 is aligned with channel 37 and permits fluid to flow between channel 37 and annular passage 44. Since annular passage 44 is circumferential, extending 360° around the rotor assembly, the passage is always in communication with nozzle 26, thereby nozzle 26 and channel 37 are always in communication. Similarly, each of the other channels of the left rotor end element are always in communication with a particular nozzle attached to the left rotor end element (nozzles 32, 34 and 36 of FIG. 2). Note that the aperture 45 in a seal ring 40 is always aligned with a nozzle but not always aligned with the end of a channel as shown in FIG. 4. An O-ring 52 is located on each side of the ring 40, as shown in FIG. 4, to prevent fluid from the aperture 45 and the annular passage 44 from flowing in a longitudinal direction parallel to the axis of rotation along the outside surface of the rotor end element and the inside surface of the ring 40.

End seal ring 39 does not rotate and is held in place by means of a set screw 8 inserted through the wall of the stator element and projecting into cavity 42 of ring 39. Rotating seal rings 40 are attached to the rotor and rotate with it. Attachment is accomplished by means of a groove 41 (see FIG. 5) in each rotating seal ring 40. There are tongues (not shown) on rotor end element 17 which matches the grooves for each seal ring 40. When tongue and groove are engaged, a seal ring is locked in place. Stationary seal ring 43 is prevented from rotating by means of a set screw in the same manner as end seal ring 39. O-rings 52 prevent fluid leakage between the rotor end element and rotating seal rings 40, as described above, and between the stator end element and the stationary seal rings 43 or end seal ring 39, in the same manner. Leakage does occur between the wall of the stator and rotating seal ring 40. This leakage lubricates and is contained at seal interface 53 which extends 360° around the rotor end element and is in a plane perpendicular to the axis of rotation. The sealing surfaces at interface 53 may be any of the well-known materials used in applications where a stationary seal face bears against a rotating seal face. For example, a common pair of seal face materials are carbon and tungsten. Seal ring 40 may be fabricated entirely of tungsten and rings 39 and 43 may be fabricated entirely of carbon, or carbon and tungsten may be applied to other base ring materials solely to form the sealing surface at interface 53.

The complete arrangement of the left rotor end element may now be understood. A rotating seal ring 40 is located at each of the four nozzles of stator end element 12. Between the rotating seal rings are located stationary seal rings 43. There are three stationary rings at each end element. At each end of the annular space formed by the left end elements is an end seal ring 39. The rotor end element shown on the right in FIG. 2 is arranged in the same manner. Only one end of the annular space between end elements can be seen in FIG. 4. The other end is shown in FIG. 3, where it can be seen that the assembly of seal rings in annular volume 54 (rings not shown) is retained by a shoulder on the rotor end element which is adjacent to rotor sleeve 51. At the outboard end, the assembly of rings is held in place by seal follower 15 (FIG. 4). Also, sealing force is applied to the sealing surface interfaces 53 by means of seal follower 15. A spring 25 is provided at each of several bolts 16. Spacers 24 enable springs 25 to be compressed by turning bolts 16 and, therefore, urge seal follower 15 toward the stator central element, thereby providing sealing force.

The arrangement of the left portion of the valve of FIG. 2 has been described in detail; the right portion of the valve, is similar. FIG. 4 in a mirror image configuration would depict the right hand portion of the valve.

FIG. 3 shows stator central element 11 and portions of stator end elements 12 and 13, along with rotor spacer element 85 and portions of rotor end elements 17 and 18. As shown in this example, end element 17 is comprised of components 81 and 82 and end element 18 is comprised of components 83 and 84. Rotor spacer element 85 and rotor end element 17 are fastened together by means of bolts such as 47. Rotor sleeve 51 provides spacing between stator element 12 and rotor element 17 and serves as a bearing. Ports, such as the two ports shown in FIG. 3 and denoted 150 and 153, extend through the inner portion of central stator element 11. Each port is parallel to the longitudinal axis of the valve and extends from one transverse surface of the stator central element to the other. Associated with each port is a fluid path denoted an opening, such as openings 151 and 152. Each opening extends to the exterior of the stator central element and provides a fluid path between a port and a nozzle. For example, opening 152 communicates between port 153 and nozzle 50. In this embodiment, there are twelve ports, all of which can be seen in FIG. 8.

Figures 6, 7, 8:
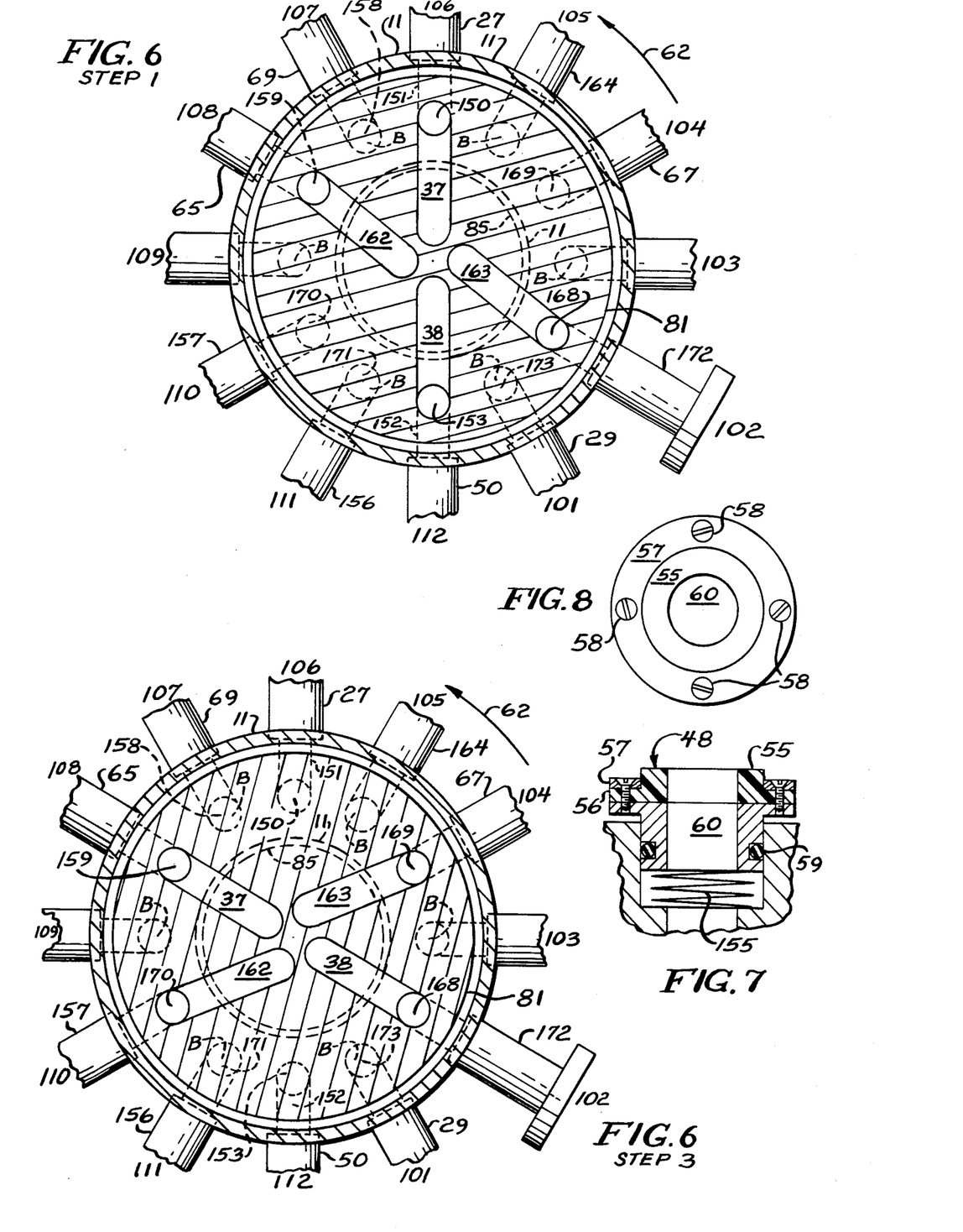
FIG. 6 step 1 and step 2 show a section, taken as shown in FIG. 3, of the central portion of the valve of FIG. 2. The rotor assembly is shown in two different positions, representing two steps in the process of FIG. 1.
FIG. 7 is a section view of an open rotor seal element.
FIG. 8 is a top view of the open rotor seal element of FIG. 7.

The right hand ends of channels 37 and 38 (the left ends are shown in FIG. 4) communicate with a transverse space, or transverse volume, formed between a portion of the end face of rotor end element component 82 and stator central element 11. Fluid flows between nozzle 27 and rotor channel 37 via opening 151, a portion of port 150, and a portion of the transverse volume. Definition of fluid passages and prevention of intermixing, in the transverse volume, of these streams and others is accomplished by means of open rotor seal elements 48. The flow path through rotor seal element 48 is denoted by reference number 60. FIG. 7 shows a section view of a single rotor seal element 48. FIG. 8 shows a top view, including the sealing surface, of a rotor seal element 48. Blind rotor seal elements 154 are provided at the end of each port which is not equipped with an open rotor seal element 48, as can be seen for ports 150 and 153. As can be seen from FIG. 3, a blind rotor seal element is identical to an open rotor seal element except that the flat plate end closure is extended to block the fluid passage in the blind element, so that fluid cannot flow through it. Thus fluid in channels 166 and 167, which are located in the right rotor end element, is prevented from entering ports 150 and 153.

A rotor seal element is located at each end of each port in the stator central assembly. In this embodiment, there are twelve open rotor seal elements 48 and twelve blind rotor seal elements 154. A length of cylindrical conduit which comprises an elongated cylindrical portion of an open rotor seal element 48 is located within a portion of port 150. That portion of port 150 has a larger diameter than other portions of the channel such that a shoulder is formed to retain spring 155 (FIG. 3). Each rotor seal element is provided with O-ring 59 (FIG. 7) around its outer circumference to prevent leakage along the wall of the port. A flat plate portion is attached to the cylindrical portion and is covered by rotor seal element seat 56 (FIG. 7). Spring 155 presses sealing face 55 against the end surface of rotor end element component 81, which is smooth and polished to prevent leakage. Sealing face 55 is a portion of rotor seal element seat 56, which is formed of a soft elastomeric material. Rotor seal element seat 56 is held in place by means of retainer 57 and four screws 58. Rotation of the rotor assembly results in wear at surface 55, as a result of the movement of the surface around the interior wall of the stator central element. Spring 155 provides sealing force and will maintain it as wear occurs, but periodically rotor element seat 56 will need to be replaced. The movement of rotor seal element 48 in the enlarged portion of channel 37 is relatively small and such movement does not affect the sealing ability of O-ring 59. As mentioned above blind rotor seal elements 154 are identical except that the flat plate portion covers the fluid passage.

All of the conduits shown in FIG. 1 are connected to the stator assembly by means of nozzles. There are twenty nozzles in this embodiment of the invention. The nozzles, which are attached to the stator and provide fluid passages between the interior of the stator and conduits connected to the nozzles, may be divided into four sets depending on their location on the stator assembly. Nozzle 26 is representative of nozzles in a first set located on one stator end assembly, in this case, the end element shown on the left in FIG. 2. Nozzle 28 is representative of a second set of nozzles located on another stator end element, depicted on the right in FIG. 2. A third set of nozzles is attached to the central stator element adjacent to the left stator end element and includes nozzle 27. Nozzle 29 is representative of a fourth set of nozzles attached to the central stator element adjacent to the right stator end element. Not all of the nozzles are shown in FIG. 2. There are six nozzles in the third set, which includes nozzle 27. Two of the nozzles of the third set are not visible in FIG. 2; they are located in positions on the back of the stator central element. The nozzles of the third set are equally spaced around the stator central element, 60° apart and their center lines are all in a single plane normal to the axis of rotation and adjacent to the left rotor element. The nozzles of the fourth set are arranged in a manner similar to the third set but are offset by 30° from the third set of nozzles. Only three third set nozzles can be seen in FIG. 2.

In FIG. 6, all of the nozzles of the third and fourth sets are shown. The section arrows of FIG. 3 show how the FIG. 6 section is taken. Arrow 62 shows the direction of rotation of the rotor assembly. The numbers denoting the twelve conduits connecting the valve to vessel 71 (FIG. 1) are shown in FIG. 6 at the appropriate nozzle to enable the flow paths to be easily understood. All of the ports and openings are depicted. For example, conduit 112 connects to nozzle 50, which communicates with port 153 by means of opening 152.

Portions of the four channels of the left rotor end element (37, 38, 162, and 163) are shown. Channels 37 and 38 appear in FIGS. 3 and 4, while channels 162 and 163 cannot be seen in those views. FIG. 6 does not show the channels of the right rotor end element, such as channels 166 and 167, which can be seen in FIG. 3; the right end channels are located directly behind the left end channels when viewing the valve in the same manner as FIG. 6. For example, channel 166 is located directly behind channel 37. The channels may be divided into two groups, a first group located in the left rotor end element and a second group located in the right rotor end element. The ports may be divided into two groups, a first group which communicates with channels of the first group and has open rotor seal elements in the left hand port ends, and a second group which communicates with channels of the second group and has open rotor seal elements in the right hand port ends. The openings can be divided into a first and a second group corresponding with the groups of ports.

Six of the twelve ports depicted in FIG. 6 are labeled with a letter B; this indicates that a blind rotor seal element is located in that end of that port. The other six port ends shown are equipped with open rotor seal elements. As mentioned above, each port is open on only one end, blocking of the fluid passage being accomplished by the blind rotor seal elements. For example, port 158 has a blind rotor seal element located at its left end (shown in FIG. 6) and an open rotor seal element at its right end (not shown). By way of further example, see ports 150 and 153 of FIGS. 3 and 6.

The complete fluid flow paths through the valve at each cycle step may now be described. At cycle step 1, feed (F) entering the valve flows through conduit 121 (FIGS. 1 and 2) to nozzle 26 (FIGS. 2 and 4). It flows from the nozzle to channel 37, passing through the annular space between rotor and stator end elements, which space contains a seal ring 40 having aperture 45 (FIG. 4). F then passes through rotor end element channel 37 into port 150 (FIGS. 3, 4, and 6) via an open rotor seal element 48 having fluid passage 60, which seal element transfers the feed through the transverse space, or volume, between rotor end element component 81 and central stator element 11 (FIG. 3). From port 150, F flows to conduit 106 via opening 151 and nozzle 27. The other end of port 150 is sealed by a blind rotor seal element 154 (FIG. 3).

At cycle step 1, F entering the valve from conduit 122 via nozzle 64 flows into channel 166 in the right rotor end element in the same manner as described for the left rotor end element. As can be seen from FIG. 3, it is prevented from flowing further by the blind rotor seal element.

Also in step 1 of the cycle, raffinate (R) enters the valve from conduit 108 via nozzle 65 (FIGS. 1 and 6), flows through an opening into port 159 (FIG. 6), and then flows through an open rotor seal element located in the left transverse volume to channel 162 (FIG. 6). It passes from channel 162 to nozzle 34 (FIG. 2) via a seal ring. From nozzle 34, R passes into conduit 94 and then conduit 95. In a similar manner, the flow path for D in step 1 includes conduits 127 and 129, nozzle 36, channel 38, port 153, opening 152, nozzle 50, and conduit 112. In step 1, E flows through conduit 102, nozzle 172, port 168, channel 163, nozzle 32, conduit 92, and conduit 90.

In cycle step 2, F flows through conduit 122 (FIGS. 1 and 2), nozzle 64 (FIG. 2), channel 166 (FIG. 3), port 158 (FIG. 6), nozzle 69 (FIG. 6), and conduit 107 (FIGS. 1 and 6). Also, D flows through nozzle 78, channel 167, port 173, nozzle 29, and conduit 101. FIG. 6, step 3, depicts step 3 of the cycle, where F enters the valve through nozzle 26 and flows through channel 37, just as in step 1, but flows from channel 37 to port 159 and then to conduit 108 via nozzle 65. Also in step 3, R flows into the valve from conduit 110 via nozzle 157 and passes through port 170 to the channel dedicated to raffinate (162).

The rotor assembly of this embodiment is arranged so that is is not subject to unbalanced forces resulting from the fluid flowing through it. Each flowing stream exerts the same force on the left rotor end element that it exerts on the right rotor end element, so that the rotor assembly "floats" in the center of the stator assembly and the bearings are not required to accept unduly large axial forces. It can be seen that no unbalanced force can exist as a result of fluid pressure in a rotor assembly channel except in the end of a channel adjacent to a stator central element port. For convenience, the term port end region will be defined to include not only the actual port ends but also the portion of a channel having the same longitudinal axis as the port.

Referring to FIG. 3, if the right end of port 150 is blocked by a plug which is rigidly attached to stator central element 11 in place of the blind seal element 154 which is shown, it can be seen that the pressure of the fluid in port 150 and the end of channel 37 will give rise to a force tending to move the rotor assembly to the left. Force exerted in an axial direction as a result of the fluid pressure would be exerted on the port end area to the left and on the stator central element to the right, causing an unbalanced force on the rotor assembly.

The blind rotor seal element transfers the force exerted on it by the fluid contained in port 150 to component 83 of the right rotor end element. Thus force is exerted as a result of the fluid in port 150 which tends to move the rotor assembly to the right, counteracting the leftward force and resulting in a balanced condition.

It can be seen that the effective axial pressure area associated with each port end region must be the same for the two end regions of any port. This is so because force in the product of pressure times area and the pressure is the same throughout any particular port and its end regions. Effective axial pressure area refers to the area subjected to pressure which gives rise to an axial force. Referring to FIG. 3, it can be seen that if the portion of channel 37 defined as being part of the port end region were enlarged in diameter, the effective axial pressure area would be made greater by the enlargement, resulting in a larger force being developed. This is simply an application of the well known piston effect, where force is amplified by use of pistons of different areas.

It can be seen that each stream flowing through the valve exerts equal force on the rotor assembly in each axial direction. Thus it makes no difference if one or more of the fluid streams flowing through the valve is greatly different in pressure from the others, for purposes of a balanced rotor. The arrangement of nozzles on the stator central element has no bearing on the pressure effects on the rotor assembly. For example, the nozzles may be arranged in a single row, if desired.

It can be seen that nozzles of the first set communicate with third set nozzles by means of channels of the first group, passages in the left hand annular space between end elements, ports and openings of the first group and passages in the transverse volume adjacent to the left rotor end element. Nozzles of the second set communicate with fourth set nozzles in a similar manner, the flow paths including channels in a second group of channels.

In the detailed example presented herein, where the fluids flowing in the process are liquids, pumps are required at certain locations. No further mention of apparatus such as pumps and compressors used to transfer fluid need be made, as those familiar with chemical processing are able to appreciate when such apparatus is required and where in the process it needs to be located.

Means for sealing other than the seal rings described above may be used. The annular space between end elements may be filled with conventional shaft packing and compressed by means similar to seal ring follower 15. Stationary lantern rings may be used in place of the rotating seal rings to provide fluid flow passageways analogous to annular passage 44. Another alternate to the above-mentioned seal rings is lip-type seals. These might be used alone or in conjunction with rings spaced along the shaft to aid in defining fluid passages, such rings being identical in configuration to a stack of flat washers. In a similar manner, there are alternates to the use of rotor seal elements 48. For example, a single large round seal plate having an elastomeric covering or liner and a center opening to accommodate a rotor spacer element might be used. A liner could be of tetrafluoroethylene, either reinforced or non-reinforced, having apertures in appropriate locations to allow fluid to flow.

Valves having different numbers of nozzles than shown in the example, to accommodate more or fewer conduits, can be designed. As discussed above, it may be desirable to utilize flushing fluids; nozzles and channels can easily be provided for this purpose. It can be seen that there is space inside the valve which will be filled with liquid. If there is a problem of cross-contamination due to this liquid, an inert liquid at a relatively high pressure may be used to purge these interior spaces. When a rotary valve is referred to as indexing, it is meant that the rotor assembly is moving. A valve index position refers to one of the positions of a rotor assembly which is stationary and where openings are in register. The components of the present invention may be fabricated from suitable materials of construction, such as metals or plastics. Sizing of the flow passages is easily accomplished by reference to any of the numerous standard methods which are available.

To illustrate valve dimensions, a rotor assembly for a valve suitable for use in the Broughton process discussed above with twelve beds and moderate fluid flow rates requiring 1½ inch diameter channels may have a total length of 42 inches, with a diameter of 5 inches at the end elements and 10 inches at the central element. A rotor end element having four 4-inch diameter channels to handle fluids at moderate pressures may have a diameter of 14 inches.

In the examples presented, nozzles have been shown as short lengths of conduit attached to, or located on, the stator assembly and having flanges for connection to the conduits to be interconnected by the valve. However, the term nozzle is used broadly to indicate means of communication between conduits and annular volumes. For example, if it is desired to connect conduits to a valve by means of welding, the term nozzle may refer to openings in the walls of the stator assembly, the stator wall being configured to accept welded-on conduits.

We claim as our invention:

1. An axial multiport rotary valve for accomplishing the simultaneous interconnection of a plurality of conduits in accordance with a previously determined cycle, where any conduit communicates, by means of the valve, with no more than one other conduit at any one valve index position, comprising:

(a) a stator assembly having a hollow interior and being comprised of a central element, a first end element, and a second end element, each of said elements having a cylindrical exterior form, the central element having first and second interior transverse surfaces, each transverse surface being perpendicular to an axis of rotation, which axis of rotation is the longitudinal axis of both the stator assembly and a rotor assembly, the central element having a plurality of internal ports, each port extending from one of the transverse surfaces toward the other transverse surface and being parallel to the axis of rotation, where the intersections of the ports with each transverse surface are arranged in a circle centered on the axis of rotation, and the central element having a plurality of openings, where each opening extends from a port to the exterior surface of the stator central element;

(b) said rotor assembly comprised of a spacer element, a first end element, and a second end element, where the spacer element is rigidly connected between the end elements, which rotor assembly is located substantially inside the hollow interior of the stator assembly such that a first annular volume is formed between said first rotor end element and said first stator end element, a second annular volume is formed between said second rotor end element and said second stator end element, a first transverse volume is formed between said first transverse surface of said central stator element and an end surface of the first rotor end element, and a second transverse volume is formed between said surface of said second transverse central stator element and an end surface of the second rotor end element, each of said rotor element end surfaces being parallel to said central stator element transverse surfaces, which rotor assembly rotates about said axis of rotation to various valve index positions in accordance with said previously determined cycle, and which rotor assembly has a plurality of interior channels;

(c) a plurality of nozzles for connection of said conduits to the valve, the nozzles being located on the stator assembly and providing fluid paths between conduits and said annular volumes inside the stator assembly and between conduits and said central stator element openings;

(d) means in said annular volumes for definition of fluid passages which communicate with said interior channels of the rotor assembly, such that fluid passes between said rotor end element nozzles and said rotor channels via said annular volume fluid passage means;

(e) port sealing means for preventing flow through only one end of each of said central stator element ports; and (f) means in said transverse volumes for definition of fluid passages which communicate between said interior channels of the rotor assembly and the ends of said ports which are not equipped with said port sealing means, such that fluid passes between said central stator element nozzles and said rotor channels via said central stator element openings, at least a portion of said ports, and said transverse volume fluid passages, thereby completing fluid paths so that different pairs of nozzles communicate at each valve index position, in accordance with said previously determined cycle.

2. The valve of claim 1 further characterized in that said nozzles are divided into four sets of nozzles, a first set attached to said first stator end element, a second set attached to said second stator end element, a third set attached to said central stator element adjacent to the first stator end element, and a fourth set attached to the central stator element adjacent to the second stator end element, said channels are divided into two groups, a first group containing channels located in the first rotor end element and a second group containing channels located in the second rotor end element, said ports are divided into two groups, a first group of ports which is in register with channels of the first group at each valve index position and a second group of ports which is in register with channels of the second group at each valve index position, and said openings are divided into two groups, a first group adjacent to the first stator end element and a second group adjacent to the second stator end element, so that nozzles of said first set of nozzles communicate with nozzles of said third set by means of passages in said first annular volume, channels in said first group of channels, passages in said first transverse volume, ports of said first group of ports, and openings of said first group of openings, and so that nozzles of said second set communicate with nozzles of said fourth set by means of passages in said second annular volume, channels of said second group, passages in said second transverse volume, ports of said second group, and openings of said second group.

3. The valve of claim 1 further characterized in that said means in said annular volumes comprises a rotating seal ring attached to and extending circumferentially around a rotor end element, said ring having a height approximately equal to the width of said annular volume between rotor and stator end elements and having a length sufficient to contain an aperture and an annular passage, which aperture and annular passage provide a fluid flow path between a channel and a nozzle, said annular passage extending 360° around the ring and bounded on one side by a portion of inside surface of a stator end assembly and on the other sides by the ring, said ring having means for sealing to prevent fluid from said aperture and channel from flowing in a longitudinal direction parallel to said axis of rotation along the interface of a portion of surface of the rotor end element and the inside surface of said ring, and said ring having two lubricated rotating seal surfaces extending 360° around the ring in planes perpendicular to said axis of rotation, where lubrication for said surfaces is provided by fluid leakage from said annular passage along the interface of outside surfaces of the ring and portions of the interior surface of the stator end element.

4. The valve of claim 1 further characterized in that said means in said annular volumes comprises a stationary seal ring attached to a stator end element and extending circumferentially around a rotor end element, said ring having a height approximately equal to the width of said annular volume between stator and rotor end elements, said ring having means for sealing to prevent fluid from flowing in a longitudinal direction parallel to said axis of rotation along the interface of the outside surface of the ring and a portion of inside surface of the stator end element, and said ring having at least one lubricated stationary seal surface extending 360° around the ring in a plane perpendicular to said axis of rotation, where lubrication for said seal surface is provided by fluid leakage from an annular volume fluid passage.

5. The valve of claim 1 further characterized in that each port of the stator central element intersects both of said interior transverse surfaces of the stator central element, in that said port sealing means transfers at least a portion of the force resulting from fluid pressure exerted on it to the adjacent rotor end element, and in that effective axial pressure area associated with each port end region is the same for the two ends of any particular port, whereby force exerted on the left rotor end element by fluid in any port is substantially equal to force exerted on the right rotor end element by fluid in that same port.

6. The valve of claim 1 further characterized in that said means in said transverse volumes comprises an open rotor seal element comprised of a length of cylindrical conduit at least partially located in and concentric with an enlarged diameter end portion of a port, which port is cylindrical in form, said open rotor seal element having means for sealing to prevent fluid flow in a direction parallel to the longitudinal axis of said conduit length along the interface of the surface of said enlarged port portion and the external surface of the conduit length, having a flat plate sealably attached to said conduit at one end, said plate being perpendicular to the longitudinal axis of said conduit and having an aperture located at the end of the conduit so that fluid may flow through the conduit, and having spring means to urge said flat plate into sealing contact with an end surface of a rotor end element.

7. The valve of claim 6 further characterized in that said flat plate portion of said open rotor seal element is at least partially covered with an elastomeric material, which is in sealing contact with said end surface of said rotor end element.

8. The valve of claim 1 further characterized in that said port sealing means comprises a blind rotor seal element comprised of a length of cylindrical conduit at least partially located in and concentric with an enlarged diameter end portion of a port, which port is cylindrical in form, said blind rotor element having means for sealing to prevent fluid flow in a direction parallel to the longitudinal axis of said conduit length along the interface of the surface of said enlarged port portion and the external surface of the conduit length, having a flat plate sealably attached to said conduit at one end, said plate being perpendicular to the longitudinal axis of said conduit and covering the end of the conduit so as to block fluid flow through the conduit, and having spring means to urge said flat plate into sealing contact with an end surface of a rotor end element.

9. The valve of claim 8 further characterized in that said flat plate portion of said rotor seal element is at least partially covered with an elastomeric material, which is in sealing contact with said end surface of said rotor end element.

* * * * *